US007118476B1

(12) United States Patent
White et al.

(10) Patent No.: US 7,118,476 B1
(45) Date of Patent: Oct. 10, 2006

(54) LOTTERY GAMING WITH MERCHANDISING PRIZES

(75) Inventors: Warren R. White, Reno, NV (US); Robert A. Luciano, Jr., Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 35 days.

(21) Appl. No.: 10/382,631

(22) Filed: Mar. 5, 2003

Related U.S. Application Data

(60) Provisional application No. 60/362,127, filed on Mar. 5, 2002.

(51) Int. Cl.
*A63F 13/00* (2006.01)

(52) U.S. Cl. .......................................... 463/17; 463/25

(58) Field of Classification Search ............ 463/16–19, 463/21–22, 25, 30–31, 42–43
See application file for complete search history.

(56) References Cited

U.S. PATENT DOCUMENTS 5,816,918 A * 10/1998 Kelly et al. ................... 463/16
6,016,338 A 1/2000 Bansal et al.
6,251,017 B1 6/2001 Leason et al.
6,331,143 B1 * 12/2001 Yoseloff ...................... 463/18
6,497,408 B1 12/2002 Walker et al.
6,524,184 B1 2/2003 Lind et al.

* cited by examiner

*Primary Examiner*—Kim Nguyen

(57) ABSTRACT

A system for use in or with lottery games (including pull-tabs and the like) is disclosed, which provides a new prize award structure. Lottery prizes are issued as certificates, redeemable only for merchandise (not cash). Certificates may be set to any level desired by a lottery operator. Certificates are enabled to be multi-leveled, having a hierarchical and value relationship between levels. Certificates may also be issued as partial certificates, requiring accumulation until they are traded in for a full certificate; partial certificates cannot be used for merchandise redemption directly. Certificates are redeemed for merchandise at physical locations or on-line. Certificates provide the flexibility to be awarded as prizes for heretofore too-frequent events, such as matching only a single ball out of six, greatly enhancing player satisfaction and involvement in lottery and lottery-style games.

14 Claims, 5 Drawing Sheets

Tiered Prize Levels With Partial Certificates

Lottery Merchandise Technology System

Certificate Redemption

Certificate Issuance

FIGURE 3: Hierarchical Prize Levels
The value of a prize at any level is deemed to be one-half the value of the prizes one level above itself and twice the value of the prizes one level below itself.
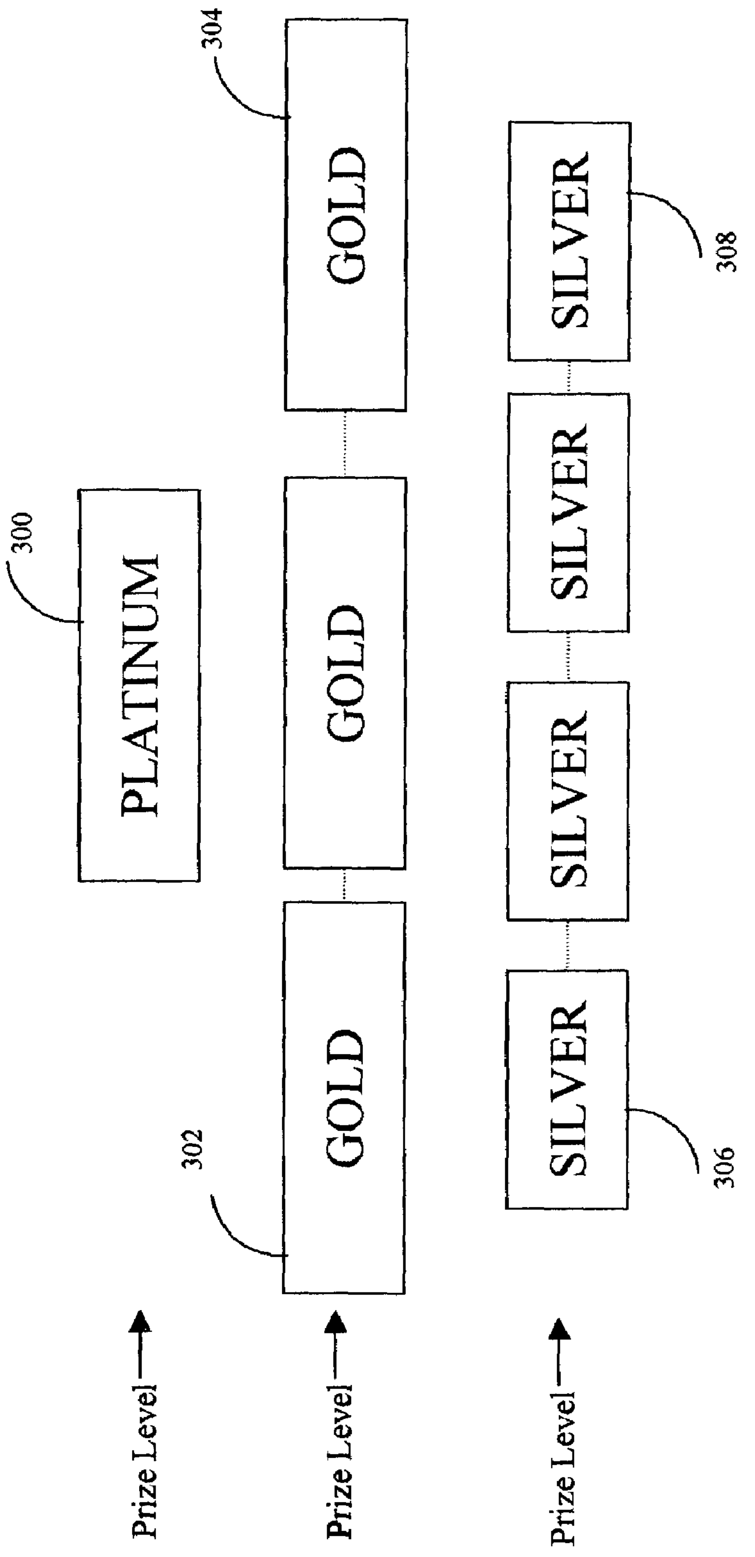

Tiered Prize Levels With Partial Certificates

Certificate Issuance: Pull-Tab

LOTTERY GAMING WITH MERCHANDISING PRIZES

RELATED APPLICATION

This application claims priority to the provisional applications entitled "Lottery Merchandise Technology System and Method," Ser. No. 60/362,127, filed on Mar. 5, 2002.

BACKGROUND OF THE INVENTION

1. Field of the Invention

This invention pertains generally to lottery systems. More particularly, the invention relates to enhancing player interest in lottery systems through the use of awarding merchandising credits or vouchers for selected pays, rather than traditional monetary awards.

2. The Prior Art

Lotteries are attractive and lucrative revenue generating games for both private and public fund raising efforts. They work so well that in the United States that a majority of states now conduct state-sponsored lotteries which offer daily, weekly, and/or other periodic jackpots ranging from hundreds to millions of dollars. These lotteries provide a steady source of income for the state.

In a typical operation, a lottery is operated by a central authority with a government-licensed operator providing much of the equipment and support necessary to establish, market, and run the operation. Such a central authority typically maintains one or more centralized operations for receiving and processing lottery entries. The lottery tickets (game entries) are sold throughout a state's jurisdiction at remote authorized lottery outlets or terminals. Private lotteries are typically run in a similar manner, having different jurisdictional considerations.

The purchase of a lottery entry typically requires a visit to an authorized lottery outlet (e.g., in person, over the telephone, or via the Internet), where the process varies depending on the type of game to be played. In a typical Lotto-style lottery game, a player selects one or more numbers from a predefined set of numbers. In a "6/49" game, for example, six numbers are selected from 49 numbers. Each set of six numbers entered in a lottery drawing is referred to as an "entry." The numbers of the entry may be selected by the purchaser or may be "auto-picked" where upon request by the purchaser a random number generator controlled by the lottery itself is used to select the numbers of the entry.

After placing a bet (making an entry), the lottery terminal typically prints a lottery ticket or receipt which lists each of the numbers of each entry selected by or picked for a player, with a game identifier (i.e., a game name and a date for the lottery drawing, but may be simply a unique numerical ID).

In a typical lottery drawing where a player has selected (as above) 6 numbers, awards will be made for matching 3, 4, 5, or 6 of the selected numbers with the lotteries numbers in the form of monetary awards. The amount of money won increases dramatically as more numbers are matched. An entry "loses" if fewer than three numbers of the entry match the numbers drawn in the lottery drawing.

While lotteries have enjoyed considerable success, many potential players are still discouraged from participating because the odds of winning are small. For example, in a typical 6/49 Lotto-style drawing where six numbers are picked randomly from a pool of forty-nine numbers, the odds of winning the grand prize is more than 13,000,000 to 1. These odds have created a negative image for many potential players, and are acting to discourage play and thereby decreasing potential revenues.

To combat this disincentive, lottery operators have tried secondary drawings (where losing tickets participate in one additional drawing for a lesser prize) as well as the traditional small awards associated with matching less than the full number of balls (in the above example, less than 6 balls). These have not proved popular with players, as the number of players has apparently not improved significantly using these improvements as compared to participation rates in basic lotteries.

In addition to the poor odds, players are completely passive in lottery systems. There is no action in playing or choosing prizes. This lack of interaction is a further demotivating factor.

There is a need for improved lottery awards, in terms of both frequency and flexibility, in order to provide incentives to a broader spectrum of potential players.

BRIEF DESCRIPTION OF THE INVENTION

The Lottery Merchandising Technology (LMT) of the present invention enables lottery operators to greatly enhance the positive experience of lottery participants. LMT does so by providing significant improvements in the award structure of lottery systems. The new award structure adds numerous options and choices, from the ability to make financially reasonable (from the lottery's perspective) awards to lottery tickets having only a single matching number, to having greatly increased player involvement in the game. Increased involvement comes in several forms, including involving players in decisions about their prizes as well as encouraging on-going collection of certificates. All yield a much higher level of player satisfaction due to the increased number of times a player wins, to increased involvement in prize selection and certificate accumulation.

Merchandise redemption also increases a player's perception of the value of the small win by making use of the difference between wholesale and retail pricing, special promotional or loss-leader items supported by a manufacturer to draw lottery winners to their products, etc.

In one embodiment, LMT enables lotteries to issue certificates as prizes, the certificates being usable for merchandise redemption only (no cash redemption value). LMT enables players to redeem their certificates at physical stores or on-line. The certificates are issued at the lottery ticket terminals, enabled to be printed by the same printers as the lottery tickets. Certificates can be authorized for specific games at different or the same prize merchandise level ("level" implies a similar worth, including but not limited to a same range of wholesale values, a same range of retail values, a set of merchandise items defined as a level by the lottery operator or defined in the LMT, etc.). Certificates are enabled from the lottery's central system, making certificates extremely flexible and responsive to game needs.

LMT enables the certificates themselves to become something to collect. LMT certificates can be issued as "partial certificates", where a partial certificate is a certificate that must be combined with other partial certificates to make up one full or redeemable certificate (partial certificates are not redeemable; they must be collected to from at least one full certificate). Partial certificates enable lottery operators to award prizes to players having very common winning events, such as matching a single number out of six. This encourages repeat play by players, by both giving them an actual award (offsets the impression of never winning) and by encouraging further play to win enough partial certificates to make up a full certificate, which can then be redeemed for merchandise.

LMT also enables tiered certificates. Tiered certificates are certificates having a defined relative value relationship between them. An example would be a lottery giving two levels of certificate, where the lesser valued certificate is deemed to be worth ¼ of the higher level certificate. A player may then use 4 lower-level certificates to redeem a prize at the higher level; alternatively, a player wishing to redeem a higher-level certificate for a merchandise at the lower level may do so, and will receive 3 lower-level certificates in "change". This creates player involvement that was not heretofore available in lotteries.

Further advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes.

FIG. 3 illustrates hierarchical certificate or prize levels in accordance with the present invention.

DETAILED DESCRIPTION OF THE PREFERRED EMBODIMENTS

Figure 1:
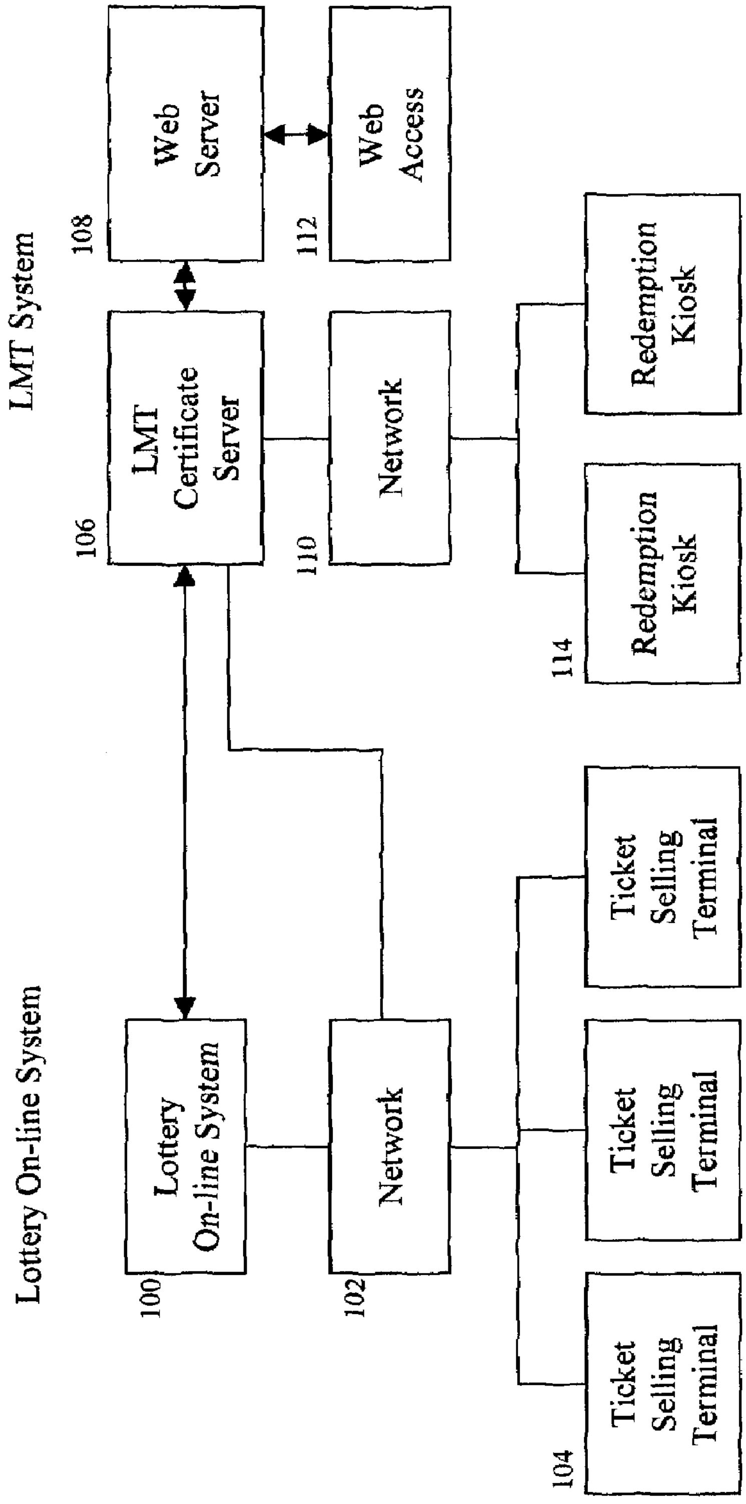
FIG. 1 is a block diagram of a system in accordance with the present invention.

Persons of ordinary skill in the art will realize that the following description of the present invention is illustrative only and not in any way limiting. Other embodiments of the invention will readily suggest themselves to such skilled persons having the benefit of this disclosure.

Referring more specifically to the drawings, for illustrative purposes the present invention is embodied in figures FIG. 1 through FIG. 5. It will be appreciated that the apparatus may vary as to configuration and as to details of the parts, and that the method may vary as to details and the order of described actions, without departing from the basic concepts as disclosed herein.

The current invention comprises secure prize certificates or vouchers as a new type of lottery prize. These prize certificates can be used singly or in combination with others to redeem for prizes from a range of available merchandise selections. The current invention is a dynamic approach to non-monetary prizes in lottery systems which will introduce new player excitement and generate revenues by opening up new markets. It allows players to choose merchandise and provides lottery operators with a range of prize award values that enable the lottery prize tables to be constructed such that a significantly higher number of players win something (a prize voucher or certificate usable for either merchandise at the indicated value level, or combinable with other prize vouchers for prizes at a higher level).

Having prize vouchers be awarded as prizes enables dynamic and flexible redemption, accumulation, and varying individual values to match the needs of each individual lottery game. In addition to the newly available player redemption merchandise won through the present invention, players may also win in very small increments, enabled for regularly occurred winning events such as a single ball match. In the latter case prize certificates may be given a cash value equivalent of, say, $0.01, but will enable a player to get merchandise worth much more after accumulating 20 of these prize certificates, and redeeming them for merchandise having a retail value of $5.00.

"Prize Certificates" may be referred to as merchandise certificates, award certificates, prize vouchers, award vouchers, merchandise vouchers, merchandise awards, and similar names; all refer to the same thing, a voucher or certificate that is redeemable for merchandise only, either alone or in combination with other vouchers/certificates, winnable through normal lottery play. The word "voucher" or "certificate" as used in this disclosure will be understood to refer, interchangeably, with any and all of the concepts expressed in this paragraph.

Certificates will be redeemable individually or in combination for merchandise prizes in one of several ways including, for example, redemption at redemption kiosks, on-line with the World Wide Web, at lottery retailers, through the same ticket selling terminals used to sell the on-line game tickets, or at lottery redemption centers.

The security of the certificates are ensured by keeping records of each one in a central computer and relating the use of that certificate to any prize redemption activity.

Certificates used with the LMT system can be used as the entire prize structure of a lottery, or can be used to supplement an existing prize structure. If used to supplement an existing prize structure, it is expected that the lottery's main prize or top several prizes, usually of high value, will remain as they are (i.e., the top or main prizes will be monetary or cash prizes). The LMT system of the present invention would typically be used for lower valued prizes (i.e., under $500, or other retail equivalent valuation). If used as the entire prize structure, then the prize distribution can be tailored to what the lottery operator wants.

A typical on-line lottery system consists of the following elements, shown in FIG. 1:

Ticket Selling Terminals (104)

These computer driven devices have a central processor, memory, a communications capability, display device, input means (keyboard, touch-screen, optical reader, smart-card reader, etc.) and a ticket printer. They are produced by a number of manufacturers, including GTECH, Automated Wagering, Essnet and others.

Lottery On-line System (100)

A computer system with one or more processors that collects ticket information and stores it in a database which is accessed using unique codes imprinted on the tickets. The system is responsible for the identification of winning tickets, the redemption of prizes and the various control and accounting tasks required to support the process.

Network (102)

The On-line system is operationally connected to a normally large number of ticket selling terminals using a data network that permits ticket selling terminals to function when separated from the On-line system by great distances.

To a traditional networked lottery system, for convenience called an "On-line System", LMT elements are added as described below. It should be noted, that although the LMT elements are described as a separate physical entity, it is fully contemplated that in an alternative implementation some or all the elements could be combined into elements of the On-line System. For example, although the LMT Certificate Server is shown as a separate processor and application it could also be implemented in an alternative embodiment where the functions it performs are executed by a process executing on the On-Line System computer. Alternatively, in yet another embodiment, the necessary functions of the LMT Certificate Server could be added to functions already performed by the On-Line System within a pre-existing process structure.

LMT Certificate Server (106)

This is a high-availability computer configuration that contains a database and a processing application. In the preferred implementation the computer configuration is a PC-based system (such as a Compaq Server system), using a Microsoft SQL Server Version 7.0 database.

The networking capabilities 102, 110 of LMT 106 allow TCP/IP communication with Redemption Kiosks 114, Web Server 108, and the communication sub-system of the On-line System 100. If the On-line System 100 is not capable of handling TCP/IP communication then a www-based interface or a custom hardware interface enabling communication using TCP/IP can be added and used.

Contained within the LMT Certificate Server 106 is the Certificate Processing Application (not shown). This is a program which is best written in C++. It performs the following functions:

issues new Certificates and creates a corresponding database record; the typical and most common case in which a new Certificate will be issued is upon being signaled by the On-line System a lottery ticket having an event thereon corresponding to a certificate has been presented by a user, and the user needs a Certificate issued at one of the ticket selling terminals;

generates a request to print the corresponding Certificate document;

processes Redemption Requests to verify that Certificates are genuine, unused and have not expired;

marking used Prize Certificate database records as used;

updating audit information to retain information for each certificate on time and place of issue and time and place of redemption; and, generate error indications on any attempts to redeem invalid or non-existent certificates.

The Redemption Kiosks 114 comprise a computer configuration that is packaged for use by the public. It typically comprises a personal computer configured with sufficient memory and input/output devices to support the application. According to one embodiment, primary input is through a touch screen and monitor combination, and communication to the LMT server (106) is by means of a Network Interface Card and a TCP/IP network. If the Redemption Kiosk is in a remote location (not associated with a location selling lottery tickets, for example), then the interface may comprise a dial-in or similar connection (such as DSL) and an interface to a redemption system web server.

Figures 2A, 2B:
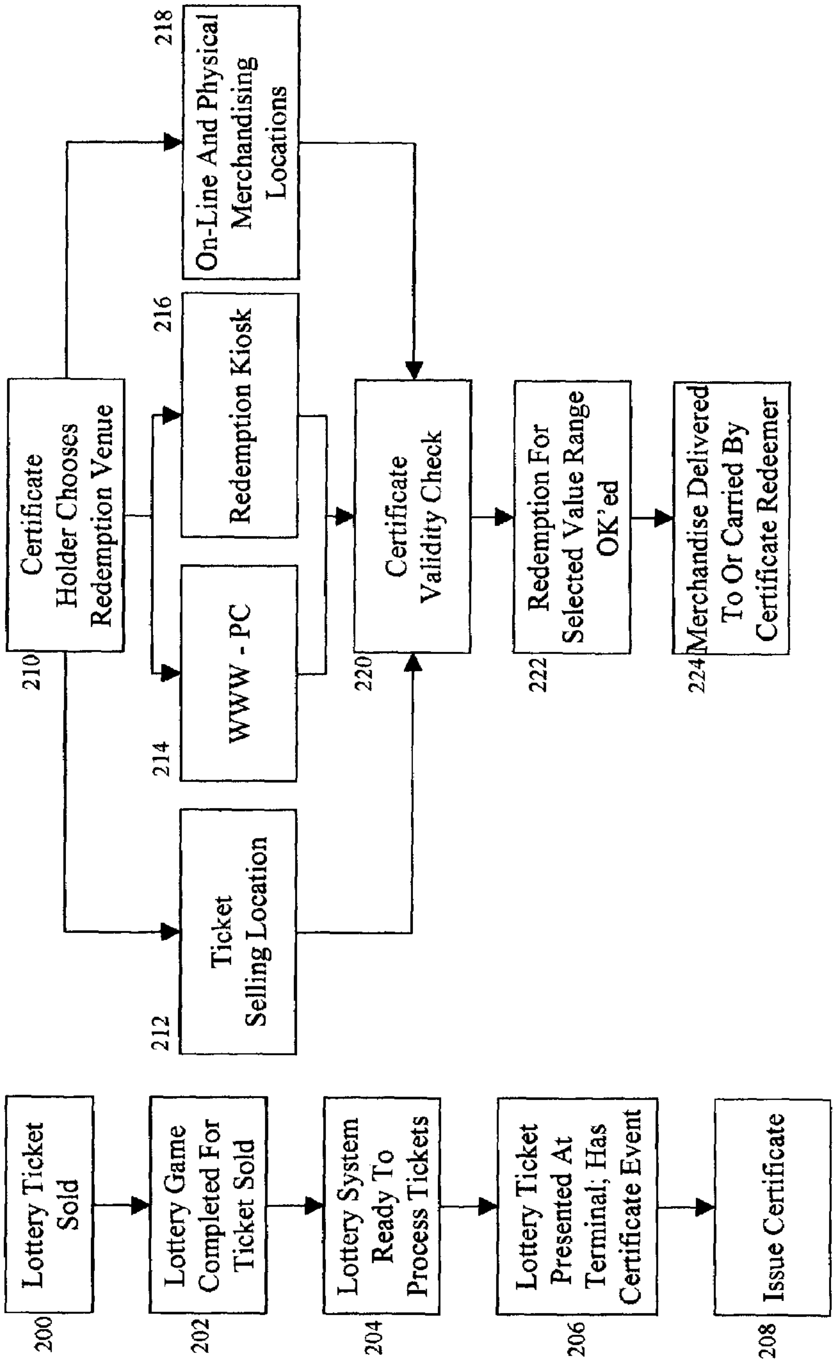
FIGS. 2*a* and 2*b* are lottery certificate logical flow diagrams according to the present invention.

FIG. 2*a* illustrates actions associated with certificate issuance. Box 200 corresponds to the actions involved in selling one or more lottery tickets to a player. Lottery tickets are sold at ticket selling terminals for a drawing (or drawings) to be held in the future. When numbers are selected or requested by the player a message is sent to the On-line System, which validates the input and assigns the ticket information a unique transaction number. The assigned transaction number is sent back to the originating ticket selling terminal and a ticket is then printed with the selected numbers on the ticket, the date and place of issue, and the transaction code that uniquely links the printed ticket to the corresponding data record in the On-line System. The transaction number is typically printed in human readable and machine-readable form. The machine readable form is usually at least partially encrypted before being encoded into a machine readable format (usually a barcode format). Box 200 is left for box 202.

The actions corresponding to box 202 are those associated with completing a lottery game by selecting winning numbers or symbols. Box 202 is left for box 204, which corresponds to the actions of providing the winning numbers or symbols to the On-line System, enabling it to process any tickets presented at the ticket terminals. Box 204 is left for box 206.

The actions corresponding to box 206 are those needed to process presented lottery tickets. Tickets are presented at the ticket terminals, and are typically scanned in by the terminal itself. The scanned information is sent back to the central lottery system, which verifies the ticket and then checks for any winning events (numbers matches, order of numbers or symbols, symbol combinations, or other events as defined by the game in question). If there is a winning event, and that event corresponds to the issuance of a certificate, the ticket is identified as a winner of a certificate at the specified value. Box 206 is left for box 208.

The actions corresponding to box 208 include those needed to issue a physical certificate, to be given to the player who presented the ticket having the certificate event thereon. The lottery central on-line system will send the information needed to the LMT Certificate Server, which will then send the specific information needed to the ticket terminal (or other ticket redemption center, perhaps manned by a person who keys in the ticket number) so the certificate can be printed. This will include information such as the cash value (if required by local laws), the redemption class or redemption level (preferably having a choice amongst items that are perceived by the player to have value over the cash value, enabled by the purchasing power of the merchandiser or redemption center who makes use of drop-shippers, etc., making use of the difference between retail and wholesale pricing), the date, ticket redemption location, a unique transaction ID, and any other information needed or deemed desirable for each specific system implemented. This information is printed on a certificate, some of which will be in human readable form and some in machine readable form. In particular, the unique transaction ID will be in machine readable form to facilitate redemption.

The ability to redeem a certificate without confirmation by the LMT server in real-time will depend on the specifics of each installation. Some operators may choose to provide a higher level of consumer satisfaction by enabling certificates to be decoded, decrypted if needed, evaluated, and redeemed for merchandise even if the LMT server is temporarily unreachable due to network problems. The down side is the potential for users to physically duplicate a certificate and try to redeem two or more copies simultaneously (by different people) at different locations. This will typically be a rare occurrence because no player will know, a priori, if the LMT server is doing real-time checking or not. However, the risk is there and each installation can make the decision to enable that functionality at the terminal level, or reserve it for the LMT server. If it is done at the terminal level, then there will need to be a software install at the terminal to enable them to decode and decrypt information read from the certificates. In a preferred embodiment, the machine readable information is encrypted before being encoded into a bar code format, providing further protection of the information thereon and making any reverse engineering effort to break the encoded information very difficult.

Continuing on to FIG. 2*b*, a person holding a certificate may choose to either collect multiple certificates to achieve a higher level of merchandise redemption than is possible with any one of their current certificates, or may choose to redeem a single certificate. The actions corresponding to box 210 are those associated with a certificate holder deciding where to redeem one or more certificates. The holder may choose to redeem it at the same location as the ticket terminal (box 214), at home over the internet using their PC (box 214), at a merchandise redemption kiosk (box 216), or at a specific merchandising location, either physical (a store location) or on-line (box 218).

It must be remembered that each actual implementation of a LMT system in accordance with the present invention has the choice, when specifying the system, which merchandising venues to use. The minimal configuration is to allow redemption at the same locations as the tickets are sold. The next step up is to provide redemption kiosks. Redemption kiosks provide "the most bang for the buck" in the sense that they enable lottery systems to use any cooperating merchandisers on the world wide web (www), while requiring the least additional cost to the place where the kiosks are installed (expected primarily to be the same locations where tickets are sold). In this situation, the location already has a network connection for lottery use, enabling certificates to be verified by the LMT server and the prize level established. The prize level information is then supplied to the specialized web server (alternatively, is used as a filter on a prize merchandise database located on either the On-line System or the LMT server), which presents the player with a selection of prizes corresponding to the value of their certificate (or certificates—the player or holder may insert multiple certificates and the LMT server or kiosk can sum them to see if the presenter my redeem prizes at a higher cost level, or simply make multiple choices at a lower level).

The next level would be to have certain local merchants enabled to verify certificates and allow the holder to pick out merchandise at the level associated with the certificate(s) (box 218), or have certain on-line merchants enabled in the same manner (also box 218). Finally, the system of the present invention would work very well with a designated website for redemption; holders would log into that website and redeem certificates on-line, picking from merchandise matching their certificate level. This last option will clearly benefit holders who are also computer users; each installation will have to decide if the demographics of their most likely players would warrant the creation of a website (such costs are very reasonable at the present time) and a database having representations of redeemable merchandise and/or dynamic links to other on-line merchants who are willing to be involved in the redemption process.

Whatever redemption path is chosen by a holder from the ones available in the particular installation, all involve continuing into box 220 where the actions corresponding to certificate verification are involved.

In one embodiment, it will be a requirement that the LMT server be available in real-time to verify each certificate presented. In that case, a signal will be sent to the machine that sent the certificate information confirming the certificate (or rejecting it), and the prize or merchandise level (typically approximating a wholesale cost).

If the redeemer is using their own PC, the certificate will have a number that must be keyed in manually.

In another embodiment, the LMT server will be queried for verification, but if the server is temporarily unavailable the terminal sending the data will be enabled to decode, decrypt (if needed), and award authorize the awarding of merchandise locally. In this case, the terminal will store the information from the certificate and as soon as the LMT server is available again, will update the information on the server.

Continuing on to box 222, the local merchant or the on-line system now has the value (or merchandise level) in which category the presenter can choose. If this is an on-line transaction, then a preferred embodiment will create a visual display for the redeemer where all the selections match the redeemer's certificate (or accumulated certificate) redemption level. If at a physical store, the redeemer may be pointed to items having a certain retail value or less, or items in a particular section or rack of the store, or ones indicated by a color or number match.

Moving on from box 222 to box 224, the merchandise is selected by the redeemer and, if on-line, the item is shipped to the redeemer or, the item is physically carried away by the redeemer.

FIG. 3 illustrates hierarchical certificates, issuable by the LMT system. There may be any number of levels; three are shown for illustrative purposes. Each level of certificate is deemed to be worth ½ of the value of the level above itself, and 2× of the level below. Thus, four Silver Certificates 306 to 308 have an equivalent merchandise value as 2 Gold Certificates 302 and 304 or 1 Platinum Certificate 300. Note it is not necessary to have a constant relationship between levels. If the two lower levels are to be awarded to tickets having a statistically high chance of being awarded, but the third level is a statistically significantly lower chance of being awarded, it may be the case that 2 Silver Certificates will have an equivalent value of one Gold Certificate, but it will take either 4 Gold Certificates or 8 Silver Certificates to have an equivalent value of one Platinum Certificate. This further allows players to use a higher-valued certificate to get merchandise at a lower level, with the kiosk or merchant giving "change" in the form of lesser valued certificates.

Figure 4:
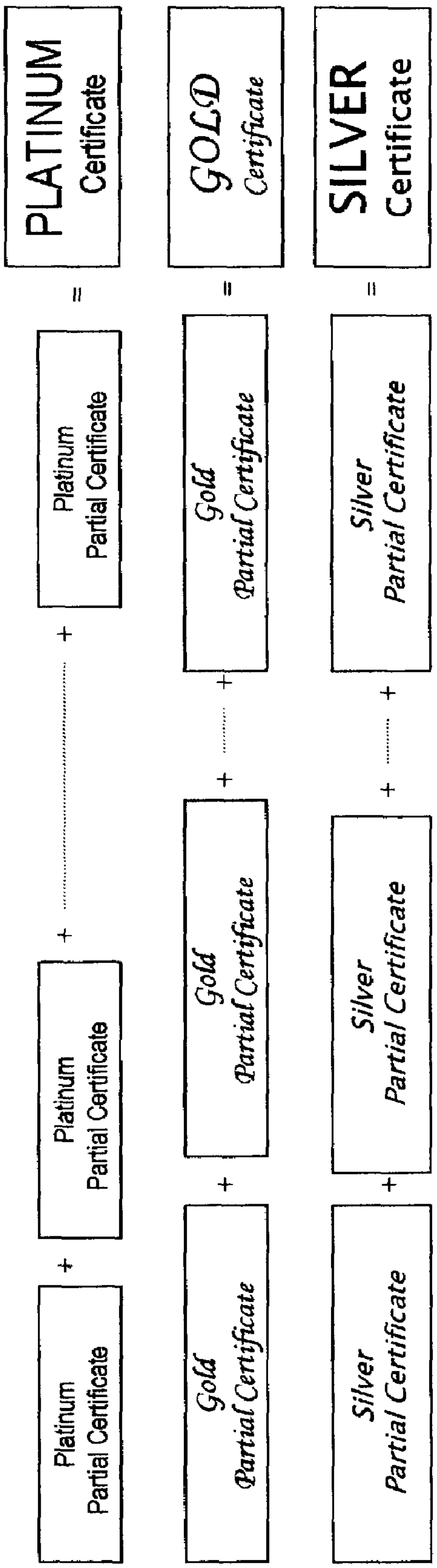
FIG. 4 illustrates partial prize certificates in accordance with the present invention.

FIG. 4 illustrates partial certificates. Partial certificates are certificates that cannot be redeemed for merchandise directly. They must be collected until the player has enough to trade them in for a full certificate (or for merchandise having the value of one full certificate). This enables lottery operators to have a great deal of flexibility in awarding prizes in the form of certificates—the cash value (what the lottery may have to eventually pay through reimbursement to a merchant who redeemed a certificate, or alternatively what the merchandise a player gets directly from the lottery upon certificate redemption costs the lottery) of partial certificates is very low. There will also be an average loss rate amongst certificates, expected to be higher amongst partial certificates (partial certificates that are not redeemed before they expire—note, all certificate will have an expiration date unless disallowed by local laws). Loss rates adds to the financial viability of using certificates by lottery operators.

Additional new advantages that will come from the system will be to allow the lottery operator to theme prizes to games, such that when a certificate is redeemed it will be associated with not just a level of merchandise, but also a kind of merchandise. It could be anything from musical themes (i.e., offering a lottery game having a blues theme, where the merchandise is a selection of CDs from blues artists) to a flower theme (merchandise from florists, etc.) to any other theme a lottery promoter wishes to focus on. This type of theme redemption has been heretofore unknown in lottery systems.

In the above implementation the LMT system has been described as a separate system interfaced to an on-line lottery system. This is one possible implementation and provided to clearly define the separate scope of processing in accordance with the invention. However, in actual implementation it may be desirable to combine various elements of the two systems so that the total cost of components may be reduced, or so that common software elements can be combined. For instance:

the two networks may be a single network infrastructure;

the lottery On-line System and the LMT database system may be combined into one computer, using separate processing modules to accomplish the same functions; or, the functions of the LMT system may be broken down into smaller components and assimilated completely or partially by modules of the On-line System In another embodiment, the LMT is used to expand the scope and attraction of an instant ticket or pull-tab game. In such games, normally operated by governmental lottery organizations or charitable institutions, tickets are preprinted with prize indications on each ticket. These indications are revealed to the player by scratching off an obscuring covering such as a latex covering, or, in the case of a pull-tab, by bending the ticket so as to break open some perforated panels, so that the panels can be pealed back to reveal one or more prize indications.

Figure 5:
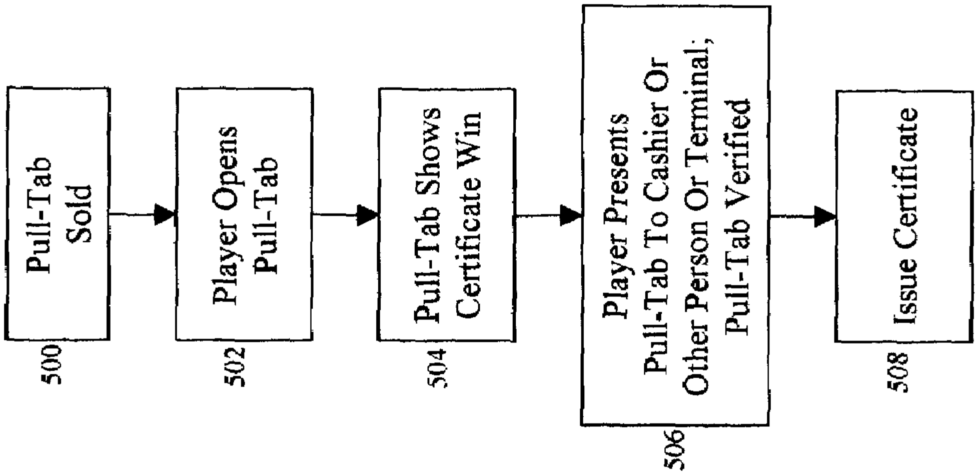
FIG. 5 is a flow diagram using pull-tabs in accordance with the present invention.

Either of these games can be modified to include Prize Certificates among the prize offerings. One way this can work is shown in FIG. 5; there are a number of implementation and alternatives which are within the scope of this invention.

Box 500 corresponds to a player purchasing a pull-tab ticket. This is typically done at a cashier's station or service counter; however, any venue will work including vending machines. Continuing into box 502, the player opens the pull-tab ("opens" is understood to include any means of revealing a pull-tab result, including but not limited to scraping off an opaque covering, breaking open a folded cardboard ticket, etc.). After opening the pull-tab, box 506 is entered which corresponds to the actions of visually checking to see if there has been a certificate award (in this flow diagram, it is assumed there is).

Continuing into box 506, the player presents the pull-tab in a venue appropriate for the selling entity. In cases where cardboard pull-tabs are used, it is expected that the player will present the pull-tab to a cashier; if the operator sells pull-tabs in vending machines, it is expected there will be an automated pull-tab redemption terminal which reads machine-readable code on the pull-tab to verify it. Any method used by any operator can be used with the present invention, when coupled with the LMT system shown in FIG. 1 (without the Lottery portion). The pull-tab is verified as to its winning status.

Finally, the actions corresponding to box 508 are those involved in issuing a certificate to a player. It is expected that this will be printed using a printer available at a cashier's station. However, it should be noted that the system of the present invention is fully compatible with small, non-networked operators as well as larger operators having expensive infrastructures. For small operators using physical pull-tabs (typically purchased at a cashier's booth or service counter, where they will have large number of pull-tabs in glass jars and the like), pre-printed certificates or partial certificates will be kept behind the counter. The pre-printed certificates (partial and full) will be uniquely numbered and issued in blocks to specific operators. It is preferable that at least part of the unique number identifies the operator to whom they were issued. When a player presents a cashier with a pull-tab having a winning certificate event thereon, the cashier will exchange the pull-tab for the appropriate level certificate or partial certificate. Players will collect and redeem the certificates in the same manner as those printed in real time, the only difference being that pre-printed certificates can be made using the same self-verifying, anti-theft, and anti-copying techniques used by the pull-tab printers.

Returning to an LMT system as shown in FIG. 1, if the operator is operably connected to the LMT (or the LMT is installed at the operator's location), then the issuance of a certificate will follow the same sequence as described earlier: the operator's system or a cashier will send a signal telling the LMT to issue a certificate (including partial certificates), including the certificate's level, an entry is made in the LMT's database including but not limited to a unique ID for the certificate, value, issuing time and date, and issuing operator/location (for on-line redemption use, so is not needed if this particular operator only allows on-site merchandise redemption).

Another important enhancement of the present invention is that the Certificate program can be conceived and implemented in such a way that the Certificates are common to a wide variety of different game styles. This could be very important to a Lottery which operates instant ticket games, on-line numbers, lotto, keno, bingo, or other games. By providing Prize Certificates that are common to more than one or all of these games, the value of the Certificates to the player is enhanced. The player, by playing a variety of games has a better perceived chance of winning and the operator has the opportunity to cross-market games and encourage repeat play and provide an incentive for players to play new lottery games that they may not have participated in before.

In a further embodiment LMT may be used in conjunction with a Bingo game or games. In such an implementation a number of independent, or linked, bingo games are configured to award Prize Certificates as prizes. A network of independent bingo halls, each with access to a common Prize Redemption may be provided. Prize Certificates may be pre-printed and issued as prizes, or they may be issued from a prize issuing terminal on request at the Bingo hall, or they may be issued by a computer at the bingo hall, if the computer is configured with software that supports a direct interface to the LMT System. Such an interface would allow direct issuance of Prize Certificates on request of the Bingo Game Computer.

As indicated earlier, it is preferred that the merchandise certificates be identified with a unique designation or ID. Recording of a certificate in a database will cause the creation of a record having the unique designation, the level or value of the certificate, and a status indication that is used to prevent the certificate from being redeemed more than once.

Other variations of the basic configuration of the present invention will come to mind of a person skilled in the software and networking arts, and having the advantage of the present disclosure. All such variations are contemplated, and are within the inventive concepts disclosed herein. For example, a player playing at a video gaming machine, upon the occurrence of a winning event, my be shown a screen that is driven by the LMT. The player will be able to make certain certificate options (i.e., two Silver Certificates rather than a single Gold Certificate) or redeem the virtual certificate for merchandise immediately, without being issued a physical certificate. Alternatively, there may be a dedicated video terminal to the LMT system at a cashier's booth, enabled to interact with a player getting a certificate in the same way.

What is claimed is:

1. A method for enhancing a lottery game, comprising:

providing a lottery game that enables a selection of a first subset of symbols from a set of symbols;

providing a player with the opportunity to win full-value prize certificates that are redeemable for merchandise;

providing a player with the opportunity to win partial-value prize certificates, wherein the partial-value prize certificates have a value less than the full-value prize certificates, and the partial-value prize certificates are not individually redeemable for merchandise;

receiving input from the player selecting a first subset of symbols;

generating and displaying winning symbols, wherein the winning symbols comprise a second subset of symbols selected from the set of symbols;

awarding monetary prizes if there is a first number of matches between the first set of symbols and the winning symbols;

awarding full-value prize certificates if there is a second number of matches between the first set of symbols and the winning symbols, wherein the second number of matches is less than the first number of matches; and awarding partial-value prize certificates if there is a third number of matches between the first set of symbols and the winning symbols, wherein the third number of matches is less than the second number of matches.

2. The method of claim 1, further comprising:

providing merchandise associated with the lottery game, wherein the merchandise is redeemable for one or more full-value prize certificates; and receiving player input selecting merchandise in exchange for one or more full-value prize certificates.

3. The method of claim 1, further comprising:

providing a plurality of levels of full-value prize certificates and partial-value certificates; and providing one or more selections of merchandise, wherein each selection of merchandise corresponds to a particular level of the full-value prize certificates.

4. The method of claim 1, wherein the first subset of symbols comprises six symbols, and wherein the first number of matches is 3, and wherein the second number of matches is 1 or 2.

5. The method of claim 1, wherein the first subset of symbol comprises six symbols, and wherein the first number of matches is 4, and wherein the second number of matches is 1, 2, or 3.

6. The method of claim 1, wherein the first subset of symbol comprises six symbols, and wherein the first number of matches is 5, and wherein the second number of matches is 1, 2, 3, or 4.

7. The method of claim 1, wherein the first subset of symbol comprises six symbols, and wherein the first number of matches is 6, and wherein the second number of matches is 1, 2, 3, 4, or 5.

8. The method of claim 1, wherein the first subset of symbol comprises five symbols, and wherein the first number of matches is 5, and wherein the second number of matches is 1, 2, 3, or 4.

9. The method of claim 1, wherein the first subset of symbol comprises five symbols, and wherein the first number of matches is 4, and wherein the second number of matches is 1, 2, or 3.

10. The method of claim 1, wherein the first subset of symbol comprises five symbols, and wherein the first number of matches is 3, and wherein the second number of matches is 1 or 2.

11. The method of claim 1, wherein the first subset of symbol comprises five symbols, and wherein the first number of matches is 2, and wherein the second number of matches is 1.

12. A method for enhancing a lottery game, comprising:

providing a lottery game that enables a selection of a first subset of symbols from a set of symbols, wherein a player is provided with the opportunity to win monetary prizes, full-value prize certificates that are redeemable for merchandise, and partial-value prize certificates, wherein the partial-value prize certificates have a value less than the full-value prize certificates, and the partial-value prize certificates are not individually redeemable for merchandise;

providing merchandise that is redeemable for one or more full-value prize certificates;

receiving input from the player selecting a first subset of symbols;

generating and displaying winning symbols, wherein the winning symbols comprise a second subset of symbols selected from the set of symbols;

awarding monetary prizes to the player if there is a first number of matches between the first set of symbols and the winning symbols;

awarding full-value prize certificates to the player if there is a second number of matches between the first set of symbols and the winning symbols, wherein the second number of matches is less than the first number of matches;

awarding partial-value prize certificates to the player if there is a third number of matches between the first set of symbols and the winning symbols, wherein the third number of matches is less than the second number of matches; and receiving player input selecting merchandise in exchange for one or more full-value prize certificates.

13. A system for enhancing lottery wins, the system comprising:

a means for running a lottery;

a means for enabling selection of a first subset of symbols from a set of symbols;

a means for selecting a second subset of symbols by the lottery, wherein the second subset is the winning symbols;

a means for determining a number of matched symbols between the first subset and the second subset, wherein the determining means is capable of issuing monetary prizes, redeemable prize certificates, and partial prize certificates for a predetermined number of matched symbols, wherein the partial prize certificates have a value less than the redeemable prize certificates and the partial prize certificates are not individually redeemable for merchandise;

a means for providing a selection of merchandise that is associated with issued prize certificates; and a means for redeeming issued prize certificates for merchandise selected by a player.

14. A method for enhancing a lottery game, comprising:

providing a lottery game;

providing a player with the opportunity to win full-value certificates that are redeemable for a prize from a selection of merchandise;

providing a player with the opportunity to win partial-value certificates that are not individually redeemable for cash or a prize;

generating and presenting a game outcome for the lottery game, wherein the game outcome comprises a plurality of symbols; and awarding a monetary prizes, full-value certificates, and partial-value certificates for winning outcomes.

* * * * *